United States Patent
Slutsky (10) Patent No.: US 11,798,139 B2
(45) Date of Patent: Oct. 24, 2023

(54) NOISE-ADAPTIVE NON-BLIND IMAGE DEBLURRING

(71) Applicant: GM Global Technology Operations LLC, Detroit, MI (US)

(72) Inventor: Michael Slutsky, Kfar Saba (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 290 days.

(21) Appl. No.: 17/099,995

(22) Filed: Nov. 17, 2020

(65) Prior Publication Data
US 2022/0156892 A1    May 19, 2022

(51) Int. Cl.
*G06T 5/00*    (2006.01)
*G06N 3/08*    (2023.01)
*G06N 3/045*    (2023.01)

(52) U.S. Cl.
CPC .............. *G06T 5/003* (2013.01); *G06N 3/045* (2023.01); *G06N 3/08* (2013.01); *G06T 5/002* (2013.01); *G06T 5/005* (2013.01); *G06T 2207/20081* (2013.01); *G06T 2207/20084* (2013.01); *G06T 2207/30248* (2013.01)

(58) Field of Classification Search
CPC ........ G06V 20/58; G06V 20/56; G06V 10/30; B60W 2420/403; B60W 2420/42; B60W 60/00; B60R 2300/00; B60R 2300/30; B60R 1/00; G06T 2207/30252; G06T 2207/30261; G06T 5/003; G06T 5/002; G06T 7/0004; G06T 2207/20201; G06K 9/0051
See application file for complete search history.

(56) References Cited

U.S. PATENT DOCUMENTS

| 10,360,664 B2 * | 7/2019 | Lee ........................ G06V 10/30 |
| 2007/0165961 A1 * | 7/2007 | Lu ............................. G06T 5/10 382/254 |
| 2008/0137978 A1 * | 6/2008 | Fu ........................... G06T 5/003 382/255 |

(Continued)

FOREIGN PATENT DOCUMENTS

| CN | 105447828 A | * | 3/2016 | ............ G06T 5/003 |
| CN | 106485685 A | * | 3/2017 | |

(Continued)

OTHER PUBLICATIONS

Jin et al., "Deep Convolutional Neural Network for Inverse Problems in Imaging", IEEE Transactions on Image Processing, vol. 26, No. 9, Sep. 2017, pp. 4509-4522.

*Primary Examiner* — Ian L Lemieux
*Assistant Examiner* — Woo C Rhim
(74) *Attorney, Agent, or Firm* — CANTOR COLBURN LLP (57) ABSTRACT

Systems and methods to perform noise-adaptive non-blind deblurring on an input image that includes blur and noise involve implementing a first neural network on the input image to obtain one or more parameters and performing regularized deconvolution to obtain a deblurred image from the input image. The regularized deconvolution uses the one or more parameters to control noise in the deblurred image. A method includes implementing a second neural network to remove artifacts from the deblurred image and provide an output image.

17 Claims, 10 Drawing Sheets

(56) References Cited

U.S. PATENT DOCUMENTS

| | | | | |
|---|---|---|---|---|
| 2011/0033130 A1* | 2/2011 | Poon | ............ | H04N 19/85 |
| | | | | 375/E7.076 |
| 2011/0158541 A1* | 6/2011 | Watanabe | ............ | G06T 5/003 |
| | | | | 382/195 |
| 2014/0348441 A1* | 11/2014 | Tezaur | ............ | G06T 5/004 |
| | | | | 382/255 |
| 2014/0355901 A1* | 12/2014 | Tezaur | ............ | G06T 5/003 |
| | | | | 382/255 |
| 2016/0070979 A1* | 3/2016 | Xu | ............ | G06V 10/42 |
| | | | | 382/190 |
| 2017/0191945 A1* | 7/2017 | Zhang | ............ | G06T 5/003 |
| 2018/0089809 A1* | 3/2018 | Tezaur | ............ | G06T 7/0012 |
| 2018/0158175 A1* | 6/2018 | Shmunk | ............ | G06T 5/20 |
| 2019/0122378 A1* | 4/2019 | Aswin | ............ | G06V 10/462 |
| 2019/0205614 A1* | 7/2019 | Kim | ............ | G06V 20/56 |
| 2020/0090322 A1* | 3/2020 | Seo | ............ | G06N 3/084 |
| 2020/0097772 A1* | 3/2020 | Nakanishi | ............ | G06N 3/04 |
| 2020/0160490 A1* | 5/2020 | Maalouf | ............ | G06F 17/18 |
| 2020/0193570 A1* | 6/2020 | Aoki | ............ | G06T 5/50 |
| 2021/0142146 A1* | 5/2021 | Kale | ............ | G06V 10/95 |
| 2021/0152735 A1* | 5/2021 | Zhou | ............ | G06T 5/001 |
| 2021/0183015 A1* | 6/2021 | Ahn | ............ | G06T 5/002 |
| 2022/0245776 A1* | 8/2022 | Vaezi Joze | ............ | G06T 5/002 |

FOREIGN PATENT DOCUMENTS

| | | | | | |
|---|---|---|---|---|---|
| CN | 108198151 A | * | 6/2018 | ............ | G06T 5/003 |
| CN | 108416752 A | * | 8/2018 | ............ | G06T 5/003 |
| CN | 109636733 A | * | 4/2019 | ............ | G06T 5/003 |
| CN | 112241669 A | * | 1/2021 | ............ | G06T 5/003 |
| CN | 108632502 B | * | 4/2021 | ............ | H04N 5/142 |
| CN | 114092416 A | * | 2/2022 | ............ | G06T 5/003 |
| DE | 102008036334 A1 | * | 4/2009 | ............ | B60R 1/00 |
| KR | 101181161 B1 | * | 9/2012 | ............ | G06T 5/003 |
| KR | 20210099456 A | * | 8/2021 | ............ | H04N 5/142 |
| TW | 202211154 A | * | 3/2022 | ............ | G06T 3/4046 |
| WO | WO-2008106282 A1 | * | 9/2008 | ............ | G06T 5/003 |
| WO | WO-2021169136 A1 | * | 9/2021 | ............ | G06K 9/00268 |

* cited by examiner

NOISE-ADAPTIVE NON-BLIND IMAGE DEBLURRING

INTRODUCTION

The subject disclosure relates generally to image deblurring and, more particularly, to noise-adaptive non-blind image deblurring.

A vehicle (e.g., automobile, truck, farm equipment, construction equipment, automated factory equipment) may include many sensors that provide information about the vehicle and its environment. An exemplary sensor is a camera. Images obtained by one or more cameras of a vehicle may be used to perform semi-autonomous or autonomous operation, for example. An image obtained by a camera may be blurred for a variety of reasons, including the movement or vibration of the camera. In the vehicle application, the source of the blurring may be well known based on known movement of the vehicle or calibration performed for the camera. This facilitates non-blind image deblurring. However, a blurred image generally includes noise as well as blurring. Accordingly, it is desirable to provide noise-adaptive non-blind image deblurring.

SUMMARY

In one exemplary embodiment, a method of performing noise-adaptive non-blind deblurring on an input image that includes blur and noise includes implementing a first neural network on the input image to obtain one or more parameters and performing regularized deconvolution to obtain a deblurred image from the input image. The regularized deconvolution uses the one or more parameters to control noise in the deblurred image. The method also includes implementing a second neural network to remove artifacts from the deblurred image and provide an output image.

In addition to one or more of the features described herein, the implementing the first neural network results in one parameter that is a regularization parameter.

In addition to one or more of the features described herein, the implementing the first neural network results in two or more parameters that are weights corresponding with a set of predefined regularization parameters.

In addition to one or more of the features described herein, the method also includes training the first neural network and the second neural network individually or together in an end-to-end arrangement.

In addition to one or more of the features described herein, the method also includes obtaining, by the processing circuitry, a point spread function that defines the blur in the input image.

In addition to one or more of the features described herein, the input image is obtained by a camera in a vehicle and the point spread function is obtained from one or more sensors of the vehicle or from the camera based on a calibration.

In addition to one or more of the features described herein, the implementing the first neural network includes obtaining a one-dimensional vector of singular values from the input image and implementing a one-dimensional residual convolutional neural network (CNN).

In another exemplary embodiment, a non-transitory computer-readable storage medium stores instructions which, when processed by processing circuitry, cause the processing circuitry to implement a method of performing noise-adaptive non-blind deblurring on an input image that includes blur and noise. The method includes implementing a first neural network on the input image to obtain one or more parameters and performing regularized deconvolution to obtain a deblurred image from the input image. The regularized deconvolution uses the one or more parameters to control noise in the deblurred image. The method also includes implementing a second neural network to remove artifacts from the deblurred image and provide an output image.

In addition to one or more of the features described herein, the implementing the first neural network results in one parameter that is a regularization parameter.

In addition to one or more of the features described herein, the implementing the first neural network results in two or more parameters that are weights corresponding with a set of predefined regularization parameters.

In addition to one or more of the features described herein, the method also includes training the first neural network and the second neural network individually or together in an end-to-end arrangement.

In addition to one or more of the features described herein, the method also includes obtaining, by the processing circuitry, a point spread function that defines the blur in the input image.

In addition to one or more of the features described herein, the input image is obtained by a camera in a vehicle and the point spread function is obtained from one or more sensors of the vehicle or from the camera based on a calibration.

In addition to one or more of the features described herein, the implementing the first neural network includes obtaining a one-dimensional vector of singular values from the input image and implementing a one-dimensional residual convolutional neural network (CNN).

In yet another exemplary embodiment, a vehicle includes a camera to obtain an input image that includes blur and noise. The vehicle also includes processing circuitry to implement a first neural network on the input image to obtain one or more parameters and to perform regularized deconvolution to obtain a deblurred image from the input image. The regularized deconvolution uses the one or more parameters to control noise in the deblurred image. The processing circuitry also implements a second neural network to remove artifacts from the deblurred image and provide an output image.

In addition to one or more of the features described herein, the processing circuitry implements the first neural network and obtain one parameter that is a regularization parameter or obtain two or more parameters that are weights corresponding with a set of predefined regularization parameters.

In addition to one or more of the features described herein, the processing circuitry trains the first neural network and the second neural network individually or together in an end-to-end arrangement.

In addition to one or more of the features described herein, the processing circuitry obtains a point spread function that defines the blur in the input image.

In addition to one or more of the features described herein, the processing circuitry obtains the point spread function from one or more sensors of the vehicle that measure a movement of the vehicle or from a calibration of the camera.

In addition to one or more of the features described herein, the first neural network obtains a one-dimensional vector of singular values from the input image and implement a one-dimensional residual convolutional neural network (CNN).

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

As previously noted, an image obtained by a camera may be blurred. In a vehicle application, movement or vibration of the camera may cause blurring of images obtained by the camera. Non-blind deblurring of blurred images refers to the scenario in which the source of the blurring and a model of the smear is known. Even when the function or model of the smear is known, non-blind deblurring is a nonstable problem, and boundary conditions must be imposed to address artifacts. That is, prior deblurring processes may introduce artifacts. Additionally, noise may be amplified if the deblurring process is not regularized. A prior approach facilitates addressing known or fixed noise in the non-blind deblurring process. Specifically, a joint training procedure is undertaken to determine both the parameters for the regularized deconvolution and the weights of a convolutional neural network (CNN).

Embodiments of the systems and methods detailed herein relate to noise-adaptive non-blind image deblurring. A first neural network (e.g., deep neural network) infers a noise-dependent regularization parameter used in the regularized deconvolution process to produce a deblurred image with artifacts. According to an exemplary embodiment, the first neural network provides a regularization parameter value $\lambda$. According to another exemplary embodiment, the first neural network provides weighting associated with each value in a predefined array of regularization parameter values $\lambda$. Using the correct regularization parameter value $\lambda$ during regularized deconvolution ensures that noise in the input (blurred) image is not amplified in an uncontrollable fashion in the deblurred image. Then a second neural network (e.g., CNN) removes artifacts from the deblurred image. A correct value of the regularization parameter $\lambda$ provided by the first neural network ensures that the value is not too small to be useful (i.e., output image is too noisy) yet not so large that the output image is still blurry. This separate, first neural network is not used according to the prior approach.

Figure 1:
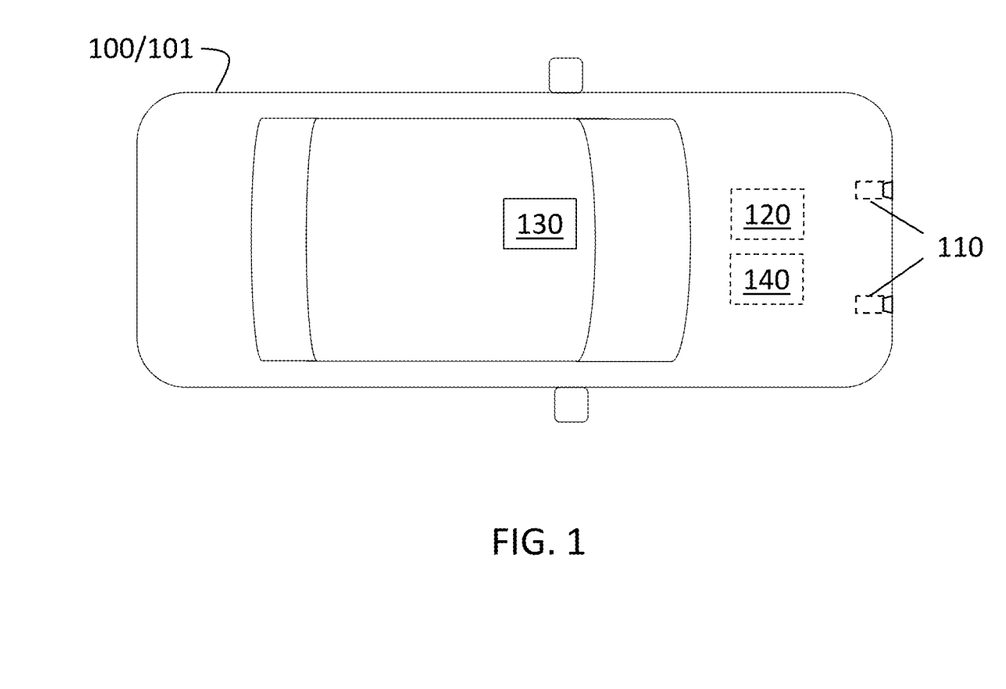
FIG. 1 is a block diagram of a vehicle in which noise-adaptive non-blind image deblurring is performed according to one or more embodiments.

In accordance with an exemplary embodiment, FIG. 1 is a block diagram of a vehicle 100 in which noise-adaptive non-blind image deblurring is performed. The exemplary vehicle 100 shown in FIG. 1 is an automobile 101. Two exemplary cameras 110 are shown to obtain images from a front of the vehicle 100. Each of the cameras 110 may be color camera or grayscale camera or any other imaging device that operates in the visible or infrared spectrum. The images obtained with the cameras 110 may be one, two, or three-dimensional images that serve as a blurred input image 210 (FIG. 2).

The vehicle 100 is also shown to include a controller 120 and additional sensors 130, 140. The additional sensors 130 (e.g., inertial measurement unit, wheel speed sensor, gyroscope, accelerometer) obtain information about the vehicle 100 while the additional sensors 140 (e.g., lidar system, radar system) obtain information about its surroundings. The controller 120 may use information from one or more of the sensors 130, 140 and cameras 110 to perform semi-autonomous or autonomous operation of the vehicle 100.

According to one or more embodiments, the controller 120 performs noise-adaptive non-blind image deblurring on blurred input images 210 obtained by one or more cameras 110. Alternately, a camera 110 may include a controller to perform the processing. In either case, the noise-adaptive non-blind image deblurring requires knowledge of the source of the blurring. The source of the blurring may be motion of the vehicle 100, which is indicated by parameters obtained by the sensors 130 of the vehicle 100, or may be inherent to the camera 110, as determined by calibration of the camera 110. The non-blind aspect of the deblurring process is known and not further detailed herein. The controller 120 and any controller of a camera 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
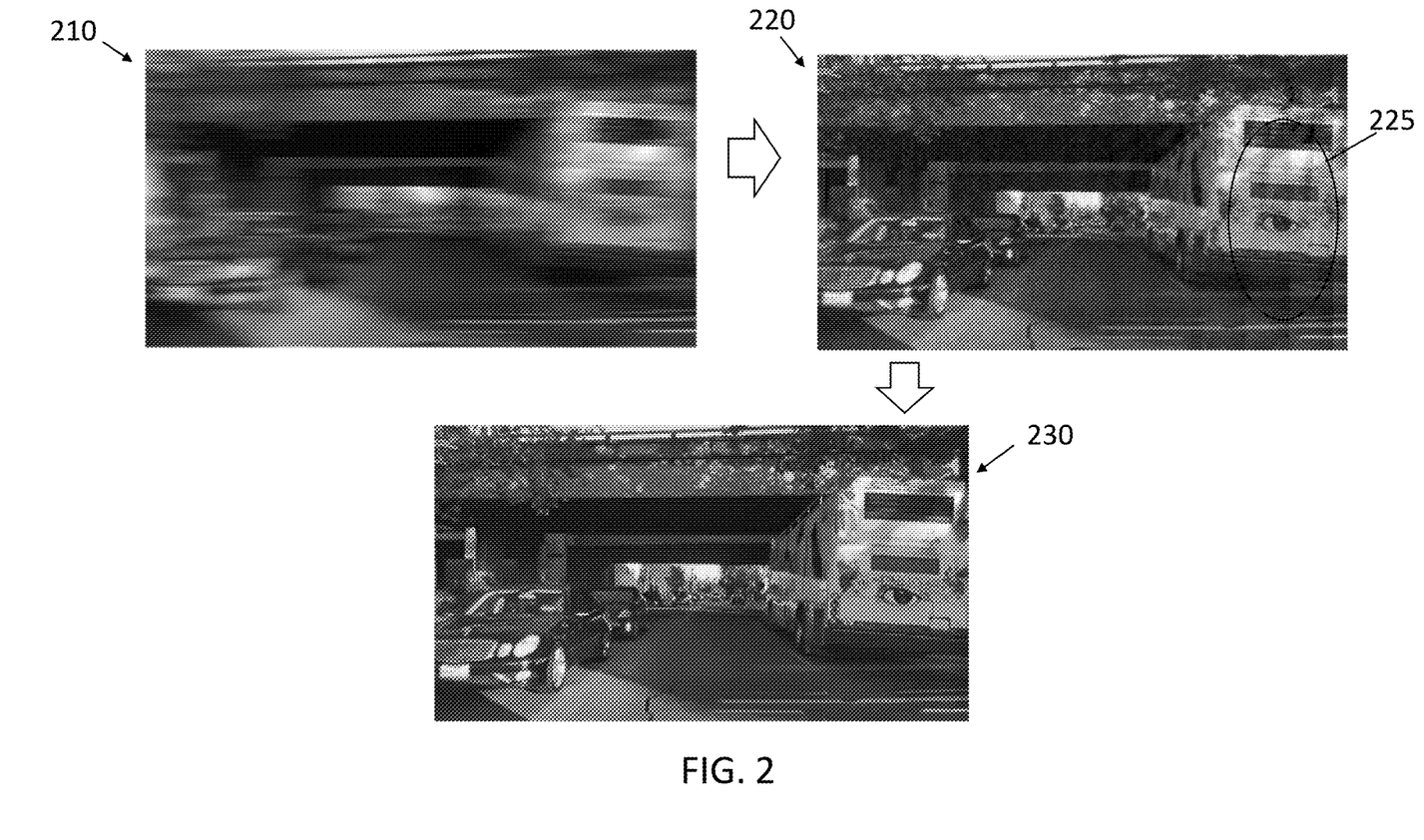
FIG. 2 shows exemplary images that illustrate the process of noise-adaptive non-blind image deblurring according to one or more embodiments.

FIG. 2 shows exemplary images that illustrate the process of noise-adaptive non-blind image deblurring according to one or more embodiments. An input image 210 is a blurred image with noise. Based on regularized deconvolution (at block 360 (FIG. 3)) using a regularization parameter $\lambda$ obtained with a first neural network 355 (implemented at block 350 (FIG. 3)), a deblurred image 220 is obtained. This deblurred image 220 may include artifacts 225. A second neural network 375 is then implemented (at block 370 (FIG. 3)) to obtain an output image 230 with the artifacts 225 removed from the deblurred image 220.

Figure 3:
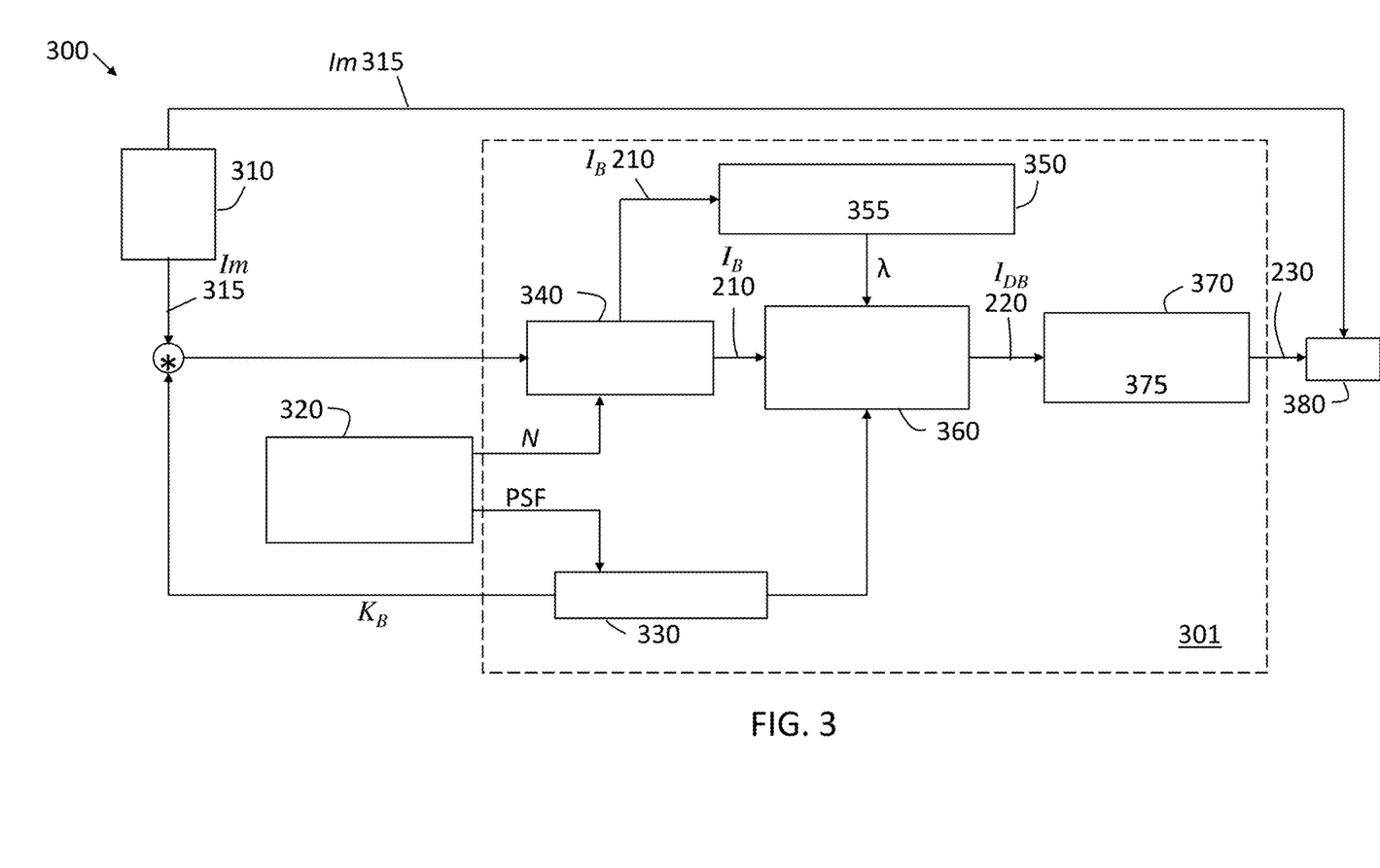
FIG. 3 shows components of a training process of a system that performs noise-adaptive non-blind image deblurring according to one or more embodiments.

FIG. 3 shows components of a training process 300 of a system 301 that performs noise-adaptive non-blind image deblurring according to one or more embodiments. As detailed and noted with reference to FIG. 2, the first neural network 355 (implemented at block 350) facilitates obtaining noise-dependent regularization parameters. A single value of a regularization parameter λ or weightings corresponding with a predefined array of values of regularization parameters λ are provided by the first neural network 355 according to alternate embodiments. In either form, the regularization parameter λ is used to control noise in the regularized deconvolution (at block 360) that provides a deblurred image 220. The second neural network 375 (implemented at block 370) facilitates removing artifacts from the deblurred image 220 to obtain the output image 230.

At block 310, obtaining a sharp image 315 (indicated as Im) refers to obtaining an image, whether in real time or from a database, without blurring or noise. To be clear, the training process 300 uses a large set of the sharp images Im 315 over many iterations. The sharp image Im 315 represents the ground truth used in the training process 300. That is, ideally, the output image 230 will be very close to this sharp image Im 315.

At block 320, performing corruption refers to generating noise N and a point spread function (PSF), both of which are applied to the sharp image Im 315 to generate the input image 210 (indicated as $I_B$) to the system 301. Each neural network may be trained individually or may be trained together in a process known as end-to-end training. Exemplary training processes for the first neural network 355 or for end-to-end training of the full system 301 are discussed with reference to FIGS. 5-9. The PSF output at block 320 represents potential sources of blurring of an image obtained by a camera 110 in a vehicle 100. The PSF may be based on motion parameters obtained by the sensors 130 of the vehicle 100 or may be measured based on calibration of the camera 110 when the blurring is inherent to the camera 110.

At block 330, the PSF is used to determine blur (i.e., generate a blur kernel matrix $K_B$). The system 301 obtains the blurred image (at block 340) from a camera 110 and determines blur (at block 330) based on information from sensors 130 or the camera 110. Because the blur is determined (at block 330) through the known PSF, the system 301 performs non-blind deblurring. Because the noise N is not known, the system 301 performs noise-adaptive deblurring. As FIG. 3 indicates, obtaining the blurred input image $I_B$ 210, at block 340, involves applying the blur (determined at block 330) to the sharp image Im 315 and adding the noise N. This is an artificial process to create the input image $I_B$ 210. In the trained system 301, noise and blur are part of the camera 110 output. The input image $I_B$ 210 is given by:

$$I_B = Im * K_B + N \quad [EQ. 1]$$

At block 350, implementing a first neural network 355 results in determining the regularization parameter λ. According to alternate embodiments, implementing the first neural network 355, at block 350, may result in the output of a regularization parameter λ value or may result in the output of weights corresponding with a predefined set of regularization parameter λ values. In the latter case, the weights of the set add to 1. The architecture 400 of the first neural network 355 is discussed with reference to FIG. 4 and training of the first neural network 355 is discussed with reference to FIGS. 5-7.

At block 360, regularized deconvolution to generate the deblurred image 220, based on the input image $I_B$ 210 and the regularization parameter λ, may be performed according to alternate embodiments. For explanatory purposes, the first neural network 355 (at block 350) is assumed to provide a regularization parameter λ value rather than weights. According to an exemplary embodiment, a Tikhonov regularized deconvolution may be used when the input image $I_B$ 210 evidences a one-dimensional blur (e.g., horizontal blur). In this case, the blur kernel matrix $K_B$ (determined at block 330) is subject to a singular value decomposition (SVD) to generate decomposition matrices:

$$K_B = USV^T \quad [EQ. 2]$$

In EQ. 2, T indicates transpose. Then, at block 360, the deblurred image 220, indicated as $I_{DB}$, is obtained, based on the decomposition matrices from EQ. 2 and the regularization parameter λ from block 350, as follows:

$$[K_B]_{REG}^{-1} = VS(S^2 + \lambda^2 I)^{-1} U^T \quad [EQ. 3]$$

$$I_{DB} \cong I_B [K_B]_{REG}^{-1} \quad [EQ. 4]$$

At block 360, according to an alternate embodiment, when the input image $I_B$ 210 includes two-dimensional blur, a Wiener deconvolution may be performed. In this case, $$\tilde{I}_B(\vec{k}) = \tilde{I}_m(\vec{k}) \tilde{K}_B(\vec{k}) + N \quad [EQ. 5]$$

$$\tilde{I}_{DB}(\vec{k}) = FFT(I_{DB}) \quad [EQ. 6]$$

The parameters shown in EQ. 5 result from a fast Fourier transform (FFT). That is, because two-dimensional blur rather than one-dimensional blur must be considered, the equations are in the Fourier space, as indicated by vector k, rather than in real space. For example, an FFT is performed on the input image $I_B$ 210 to obtain $\tilde{I}_B$. The deblurred image $I_{DB}$ 220 is obtained as:

$$\tilde{I}_{DB}(\vec{k}) = \tilde{I}_B(\vec{k}) \frac{\tilde{K}_B^*(\vec{k})}{\left|\tilde{K}_B(\vec{k})\right|^2 + \lambda^2} \quad [EQ. 7]$$

$$\tilde{I}_{DB}(\vec{k}) = \tilde{I}_B(\vec{k}) = \tilde{I}_m \tilde{K}_B^{-1}(\vec{k}, \lambda) \quad [EQ. 8]$$

Based on EQ. 8, the deblurred image $I_{DB}$ 220 is obtained by performing an inverse FFT (IFFT) on $\tilde{I}_{DB}(\vec{k})$.

At block 370, implementing the second neural network 375 on the deblurred image $I_{DB}$ 220 results in the output image 230. The image enhancement neural network that removes artifacts from the deblurred image $I_{DB}$ 220 and which is indicated as the second neural network 375 is well-known and is not detailed herein. End-to-end training, which refers to training the first neural network 355 and the second neural network 375 together, is discussed with reference to FIGS. 8 and 9. As FIG. 3 indicates, a mean square error (MSE) may be obtained between the output image 230 provided by the system 301 and the sharp image Im 315 to ascertain the effectiveness of the noise-adaptive non-blind deblurring performed by the system 301.

Figure 4:
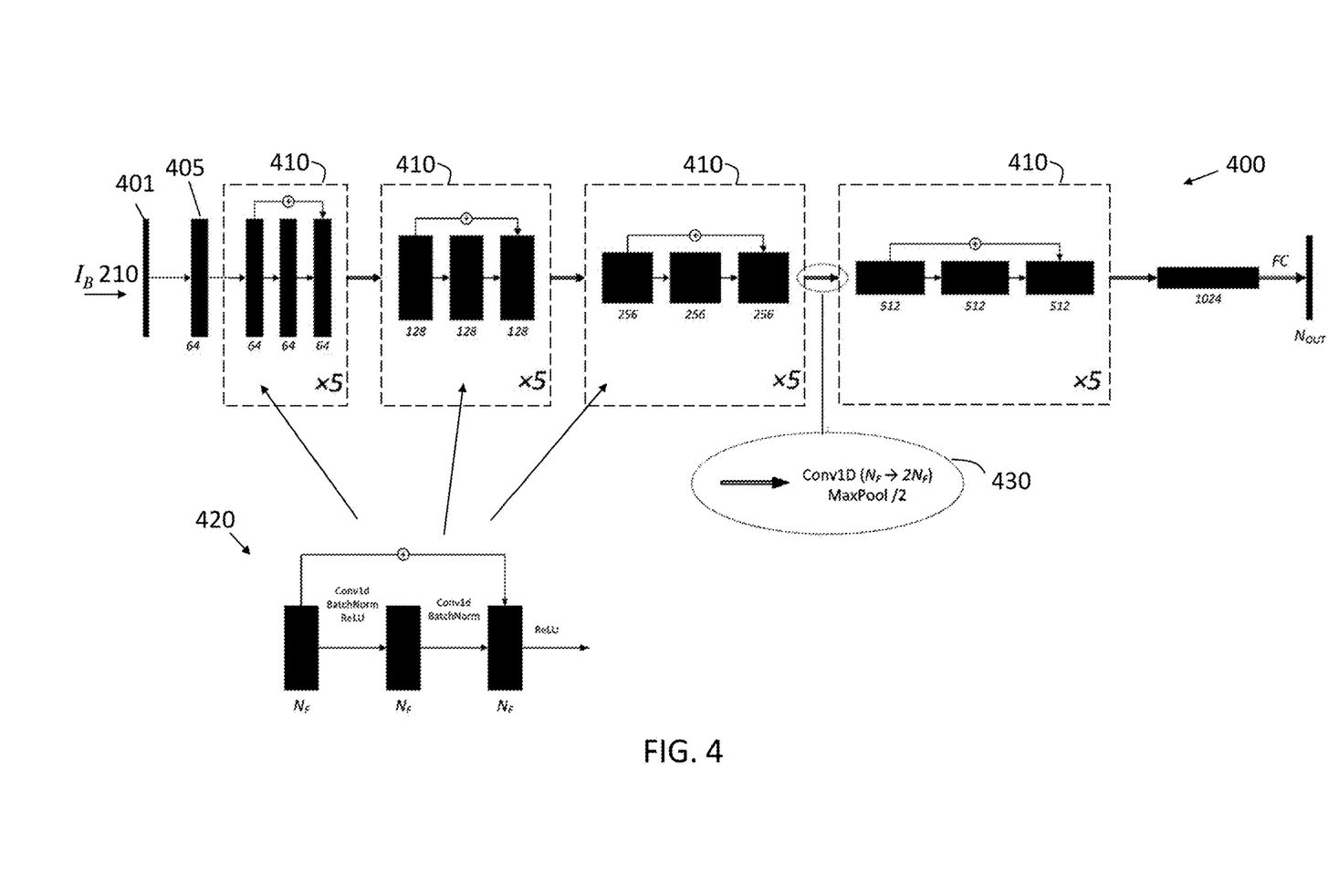
FIG. 4 shows the architecture of the first neural network used to perform noise-adaptive non-blind image deblurring according to one or more embodiments.

FIG. 4 shows the architecture 400 of the first neural network 355 used to perform noise-adaptive non-blind image deblurring according to one or more embodiments. The first neural network 355 is a one-dimensional residual CNN. The input to the first neural network 355 is the input image $I_B$ 210, which is a blurred image with noise, and the output $N_{out}$ may be a value of the regularization parameter λ or may be a set of weights that corresponding with values of a set of predefined regularization parameters λ. An SVD is performed on the input image $I_B$ 210, at 401, to obtain a one-dimensional vector of image singular value (SV) logarithms. The first convolutional layer 405 converts the input to 64 feature vectors. The next four stages 410 are cascades of five residual blocks. While five residual blocks are indicated for each stage 410, the exemplary embodiment of the architecture 400 does not limit other numbers of subunits in alternate embodiments.

The known operations that are part of each cascade 420, as indicated for the exemplary cascade 420 in FIG. 4, include "Conv1d," which refers to a filter sliding along the data across one dimension, "BatchNorm," which refers to a batch normalization type of layer, and "ReLU," which refers to a rectified linear unit. The number of filters $N_f$ may be 64, 128, 256, or 512, as indicated for the different stages 410. As indicated at 430, there is a feature number doubling convolutional layer and a max-pooling layer following each cascade 420. At the output, 1024 feature vectors are fed into a fully connected layer "FC" to produce the output $N_{out}$.

Figure 5:
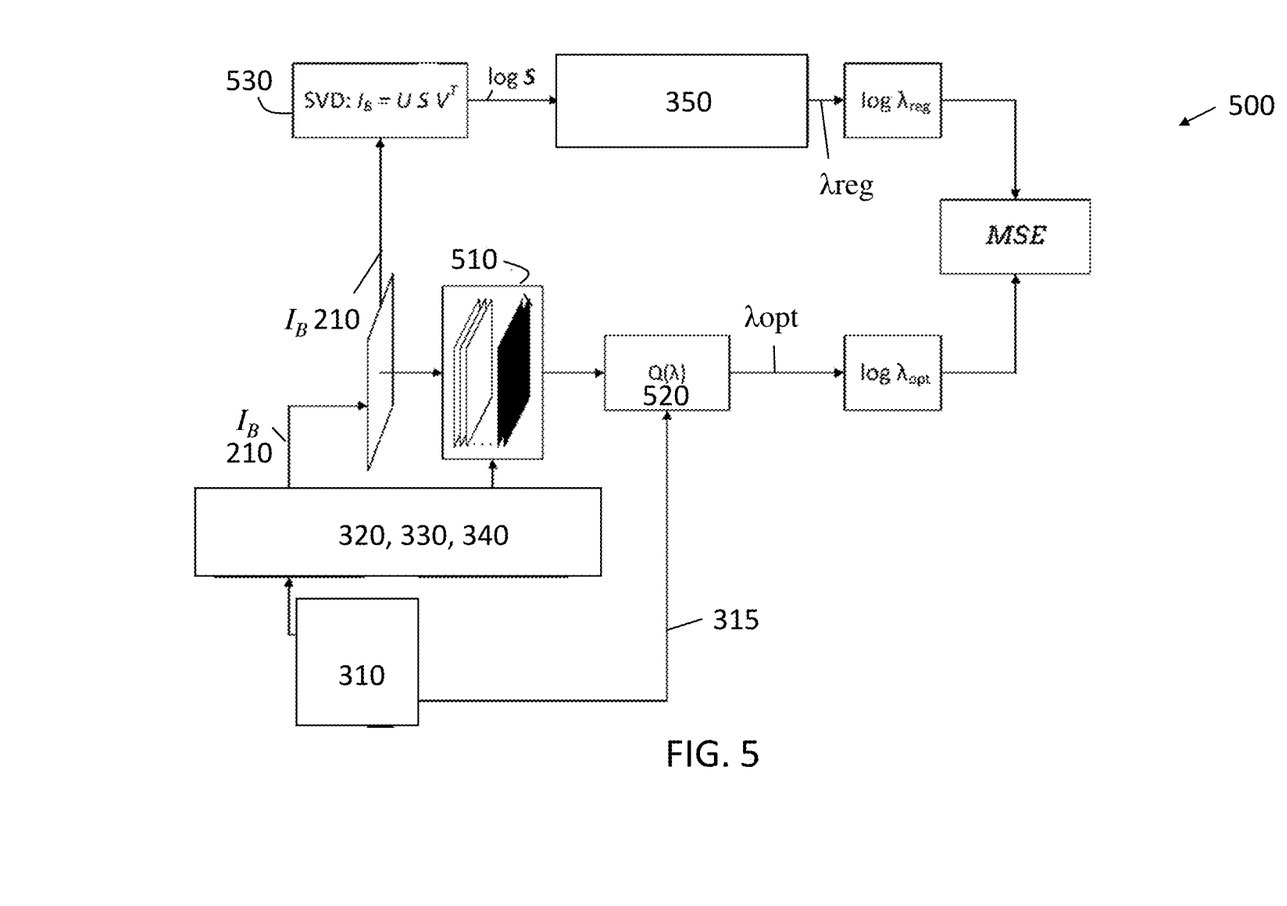
FIG. 5 shows a process flow for training the first neural network used to perform noise-adaptive non-blind image deblurring according to one or more embodiments.
Figure 6:
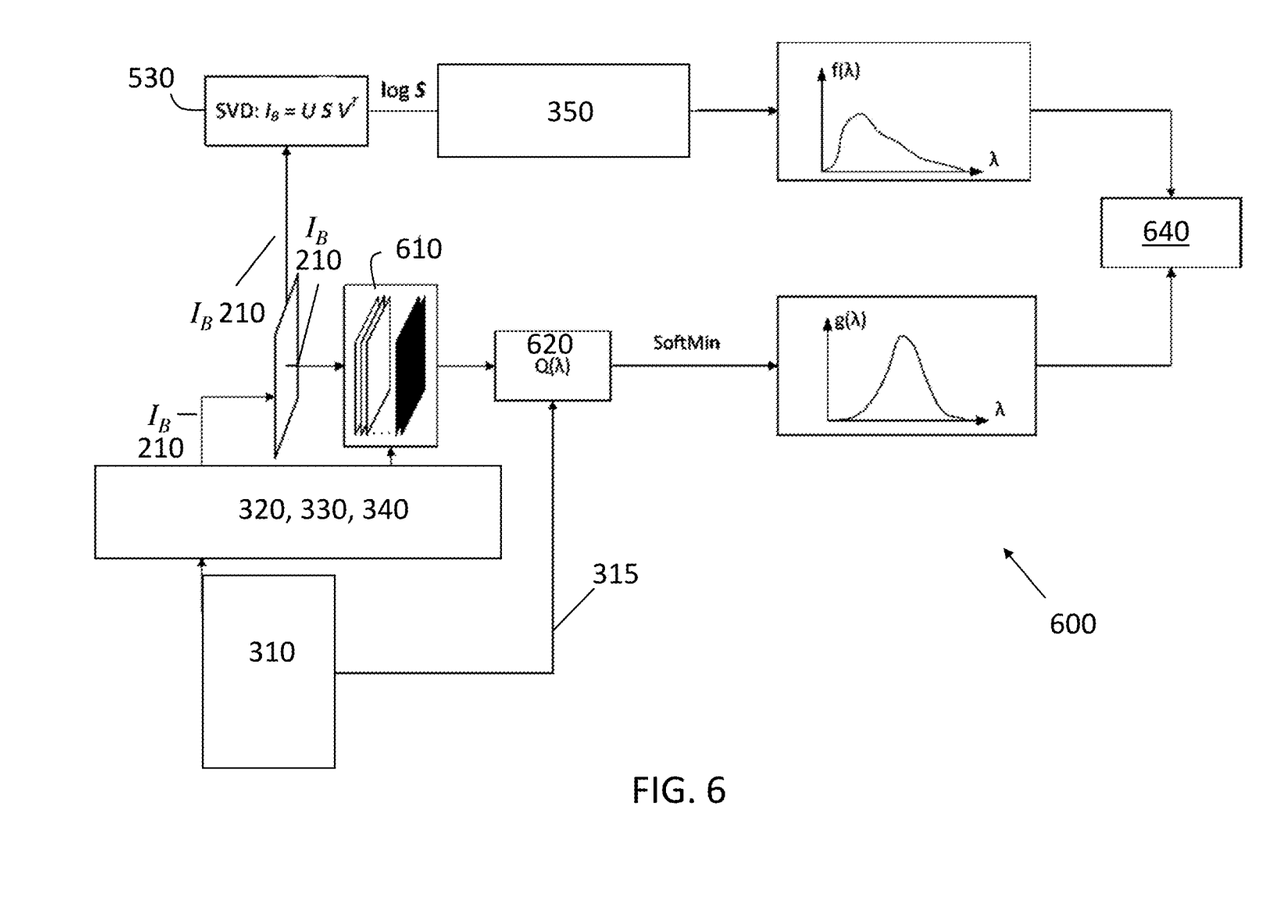
FIG. 6 shows a process flow for training the first neural network used to perform noise-adaptive non-blind image deblurring according to one or more embodiments.

FIGS. 5 and 6 detail the training of the first neural network 355 used to perform noise-adaptive non-blind image deblurring according to one or more embodiments. As previously noted, end-to-end training refers to training both neural networks according to the arrangement shown in FIG. 3. According to alternate embodiments shown in FIG. 5 or FIG. 6, the first neural network 355 may be trained separately from the second neural network 375. When the first neural network 355 is trained individually, the ground truth is obtained by a function Q(λ), as detailed.

FIG. 5 shows a process flow 500 for training the first neural network 355 used to perform noise-adaptive non-blind image deblurring according to one or more embodiments. The process flow 500 shown in FIG. 5 is used with one-dimensional blur and when the output of the first neural network 355 is a regularization parameter λ value. The previously described processes at blocks 310 to 340 to obtain the sharp image Im 315 and the blurred input image $I_B$ 210 are not discussed again. At block 510, a set of images is obtained as regularized deconvolution results for a set of values of the regularization parameter λ. At block 520, the function Q(λ) selects the optimal regularization parameter λ, λopt, from among the set of values of the regularization parameter λ. That is, the function Q(λ), at block 520, obtains a mean square distance (MSD) between each of the set of images (generated with the set of values of the regularization parameter λ) and the sharp image Im 315 and selects the regularization parameter λ corresponding with the image that results in the minimum MSD as λopt.

At block 530, the input image $I_B$ 210 is subjected to an SVD to generate decomposition matrices, similarly to EQ. 2. At block 350, according to the exemplary embodiment, implementing the first neural network 355 results in a single regularization parameter λreg. For a more precise comparison, a log scale of the regularization parameter λreg and the optimal regularization parameter λopt is compared based on MSE. The process flow 500 may be repeated for a large set of the sharp images Im 315 to train the first neural network 355.

FIG. 6 shows a process flow 600 for training the first neural network 355 used to perform noise-adaptive non-blind image deblurring according to one or more embodiments. The process flow 600 shown in FIG. 6 is used with one-dimensional blur and when the output of the first neural network 355 is a set of weights corresponding with a set of predefined values of regularization parameters λ. As in the discussion of FIG. 5, previously described processes at blocks 310 to 340 to obtain the sharp image Im 315 and the blurred input image $I_B$ 210 are not discussed again. At block 610, a set of images is obtained as regularized deconvolution results. Each image in the set results from a particular set of weights corresponding with a set of predefined regularization parameter λ values.

At block 620, the function Q(λ) selects the set of weights that results in an image with a minimum MSD relative to the sharp image Im 315. The SoftMin function then rescales the weights to ensure that they are between 0 and 1. The result is the weighting function g(λ) such that the area under the curve will add to 1. At block 530, the input image $I_B$ 210 is subjected to an SVD to generate decomposition matrices, similarly to EQ. 2 (as discussed with reference to FIG. 5). At block 350, according to the exemplary embodiment, implementing the first neural network 355 results in a set of weights indicated as the function f(λ). At block 640, a weighted sum of images, according to the functions g(λ) and f(λ) are compared. The process flow 600 may be repeated for a large set of the sharp images Im 315 to train the first neural network 355.

Figure 7:
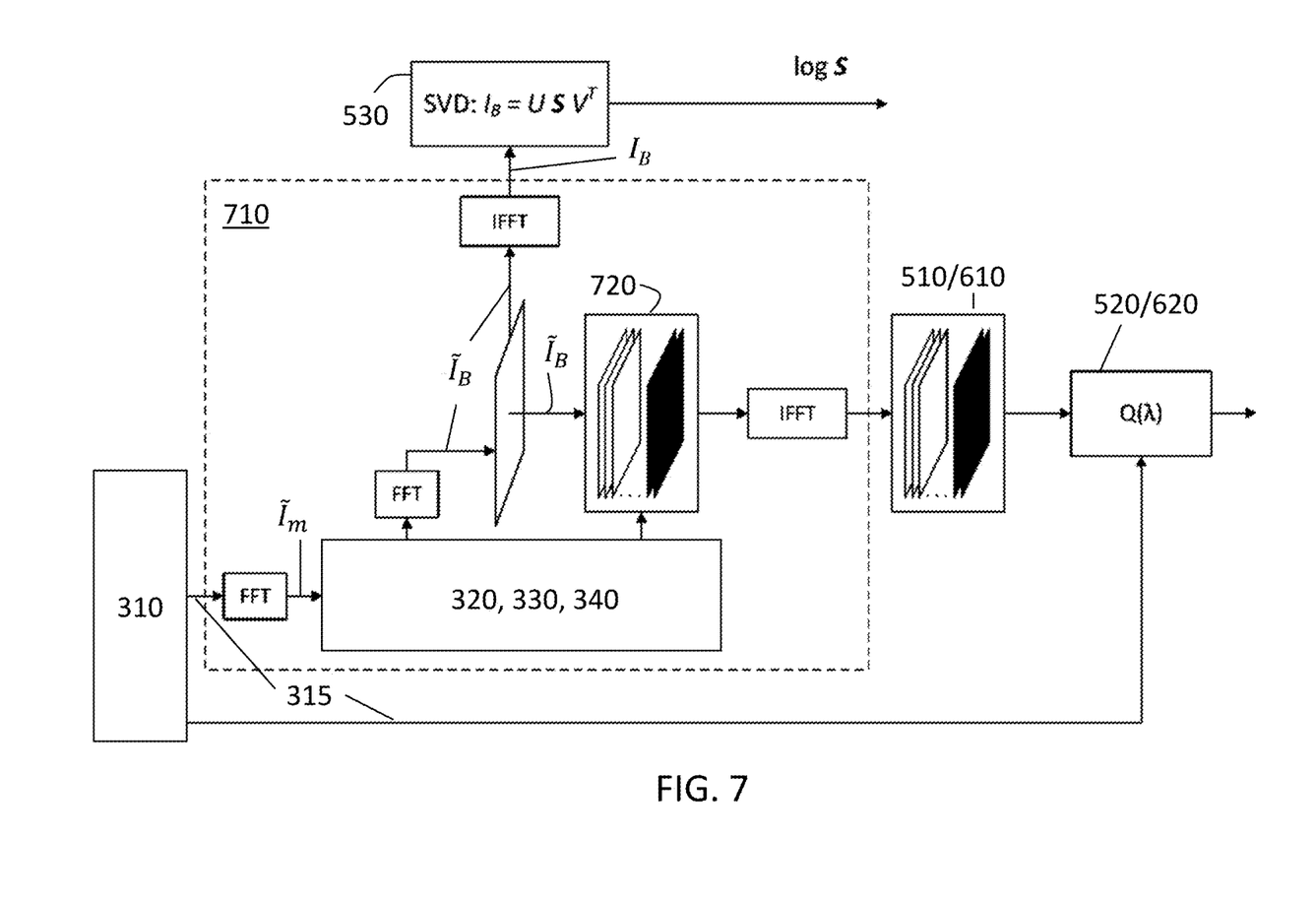
FIG. 7 shows additional processes needed to generate ground truth in order to train the first neural network when the blur is in two dimensions.

FIG. 7 shows additional processes 710 needed to generate ground truth in order to train the first neural network 355 when the blur is in two dimensions. The previously discussed processes will not be detailed again. The additional processes 710 include performing an FFT on the sharp image Im 315 that is an input to the additional processes 710. The additional processes 710 also include IFFTs at the outputs of the additional processes 710. At block 720, regularized deconvolution results are obtained in the Fourier space. The additional processes 710 may be used to train a first neural network 355 for two-dimensional blur whether the first neural network 355 provides a single regularization parameter λ or weights for a predefined set of regularization parameter λ values.

Figure 8:
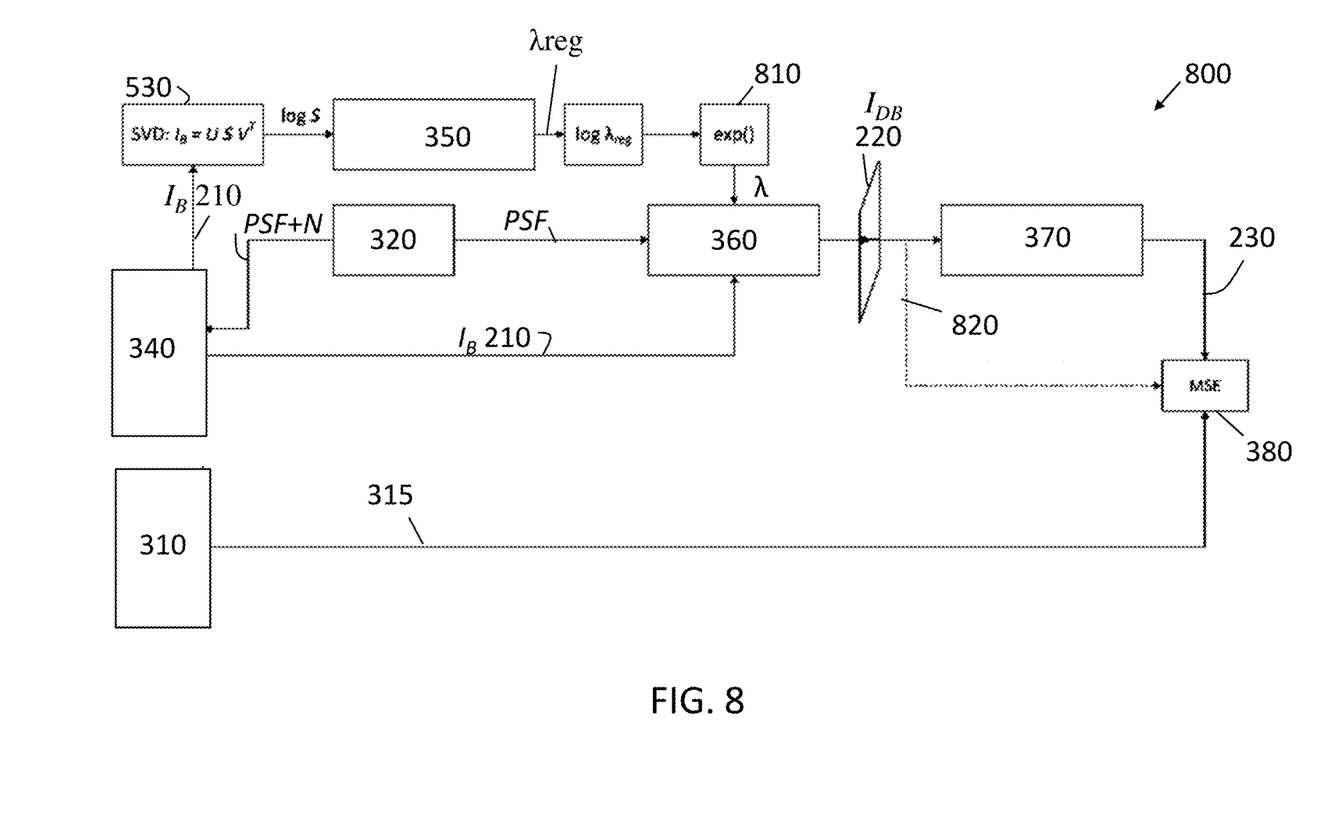
FIG. 8 shows an exemplary process flow for end-to-end training of the neural networks used to perform noise-adaptive non-blind image deblurring according to one or more embodiments.

FIG. 8 shows an exemplary process flow 800 for end-to-end training of the neural networks used to perform noise-adaptive non-blind image deblurring according to one or more embodiments. The exemplary process flow 800 is used when the first neural network 355 outputs a regularization parameter λ. The exponential at block 810 of the log result provides the regularization parameter λ used by the regularization deconvolution at block 360. The bypass 820 is a pretraining bypass and allows bypassing the second neural network 375 (implemented at block 370). This facilitates a comparison, at block 380, of the deblurred image $I_{DB}$ 220 with the sharp image Im 315. When the bypass 820 is not used, the output image 230 is compared with the sharp image Im 315 such that the result of both the first neural network 355 (implemented at block 350) and the second neural network 375 (implemented at block 370) is verified as part of the overall system 301.

Figure 9:
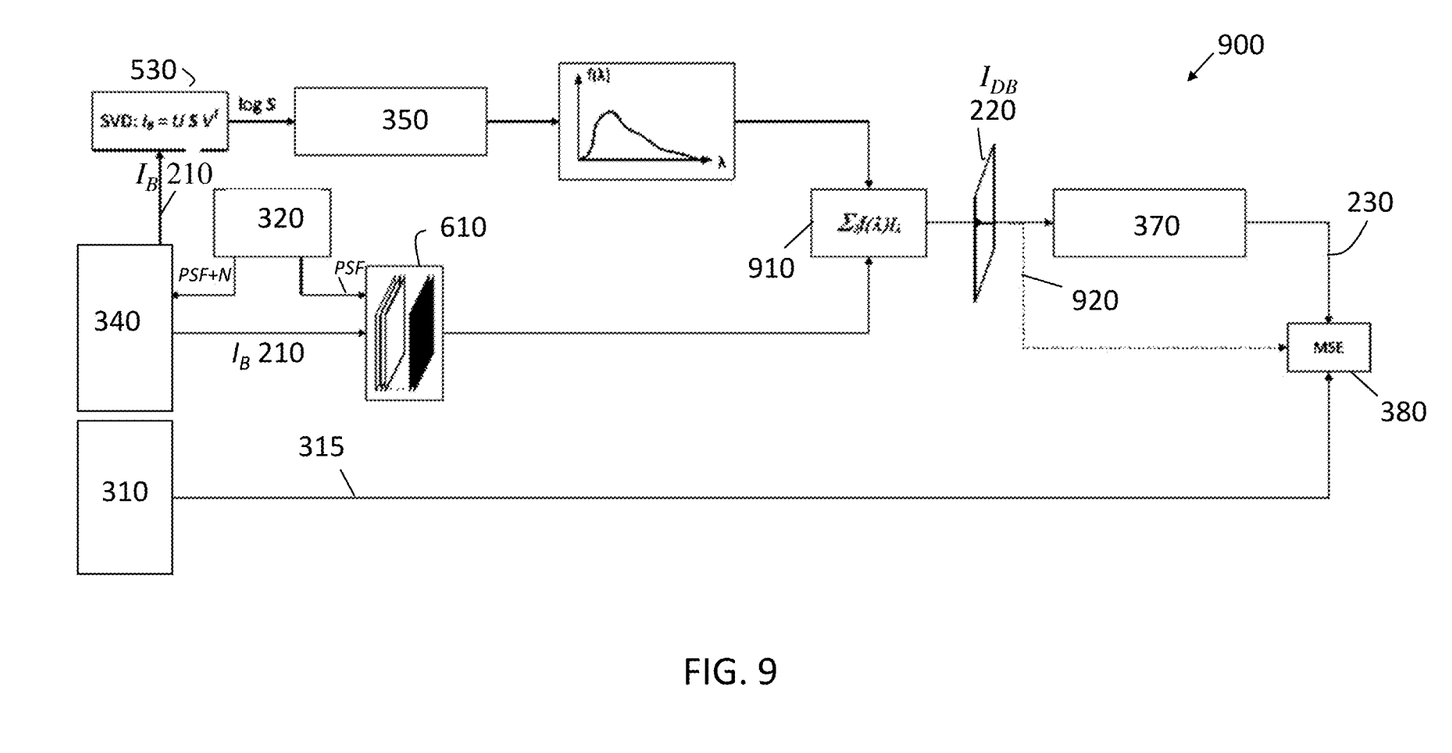
FIG. 9 shows an exemplary process flow for end-to-end training of the neural networks used to perform noise-adaptive non-blind image deblurring according to one or more embodiments.

FIG. 9 shows an exemplary process flow 900 for end-to-end training of the neural networks used to perform noise-adaptive non-blind image deblurring according to one or more embodiments. The exemplary process flow 900 is used when the first neural network 355 outputs a set of weights corresponding to a predefined set of regularization parameter λ values. As indicated in FIG. 9, implementing the first neural network 355, at block 350, results in the weights as a function f(λ) of the predefined set of regularization parameter λ values. At block 610, a set of deconvolved images is generated with each deconvolved image resulting from a different one of the predefined set of regularization parameter λ values. At block 910, a weighted sum of the deconvolved images (from block 610) is obtained based on the weights obtained from the first neural network 355.

Like the bypass 820 in FIG. 8, the pretraining bypass 920 in FIG. 9 allows bypassing the second neural network 375 (implemented at block 370). This facilitates a comparison, at block 380, of the deblurred image $I_{DB}$ 220 with the sharp image Im 315. When the bypass 920 is not used, the output image 230 is compared with the sharp image Im 315 such that the result of both the first neural network 355 (implemented at block 350) and the second neural network 375 (implemented at block 370) is verified as part of the overall system 301.

Figure 10:
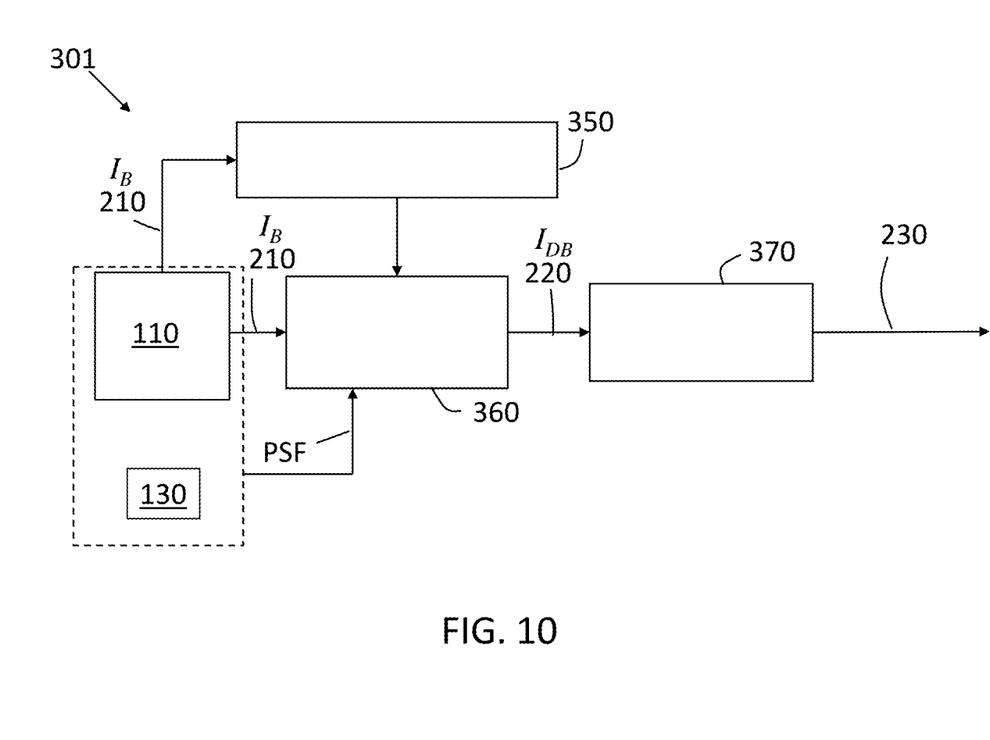
FIG. 10 is a block diagram of the system to perform noise-adaptive non-blind image deblurring according to one or more embodiments

FIG. 10 is a block diagram of the system 301 to perform noise-adaptive non-blind image deblurring according to one or more embodiments. The system 301 may be implemented by processing circuitry of the controller 120 of the vehicle 100, for example. A camera 110 provides the blurred input image $I_B$ 210. The camera 110 itself and/or sensors 130 that indicate motion of the vehicle 100 provide the PSF that indicates the cause of the blur and facilitates non-blind deblurring. At block 350, implementing a first neural network 355 provides a regularization parameter λ or weights corresponding to a predefined set of regularization parameter λ values. The first neural network 355 facilitates control of the noise in the input image $I_B$ 210 (i.e., noise-adaptive deblurring). At block 360, regularized deconvolution provides a deblurred image $I_{DB}$ 220. At block 370, implementing the second neural network 375 facilitates removing artifacts from the deblurred image $I_{DB}$ 220 to generate the output image 230. This output image 230 may be displayed in the vehicle 100 or used for object detection and classification.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of performing noise-adaptive non-blind deblurring on an input image that includes blur and noise, the method comprising:
    implementing, using processing circuitry, a first neural network on the input image to obtain one or more parameters, wherein the implementing the first neural network includes obtaining a one-dimensional vector of singular values from the input image and implementing a one-dimensional residual convolutional neural network (CNN);
    performing, using the processing circuitry, regularized deconvolution to obtain a deblurred image from the input image, wherein the regularized deconvolution uses the one or more parameters to control noise in the deblurred image; and
    implementing, using the processing circuitry, a second neural network to remove artifacts from the deblurred image and provide an output image.

2. The method according to claim 1, wherein the implementing the first neural network results in one parameter that is a regularization parameter.

3. The method according to claim 1, wherein the implementing the first neural network results in two or more parameters that are weights corresponding with a set of predefined regularization parameters.

4. The method according to claim 1, further comprising training the first neural network and the second neural network individually or together in an end-to-end arrangement.

5. The method according to claim 1, further comprising obtaining, by the processing circuitry, a point spread function that defines the blur in the input image.

6. The method according to claim 5, wherein the input image is obtained by a camera in a vehicle and the point spread function is obtained from one or more sensors of the vehicle or from the camera based on a calibration.

7. A non-transitory computer-readable storage medium storing instructions which, when processed by processing circuitry, cause the processing circuitry to implement a method of performing noise-adaptive non-blind deblurring on an input image that includes blur and noise, the method comprising:
    implementing a first neural network on the input image to obtain one or more parameters, wherein the implementing the first neural network includes obtaining a one-dimensional vector of singular values from the input image and implementing a one-dimensional residual convolutional neural network (CNN);
    performing regularized deconvolution to obtain a deblurred image from the input image, wherein the regularized deconvolution uses the one or more parameters to control noise in the deblurred image; and
    implementing a second neural network to remove artifacts from the deblurred image and provide an output image.

8. The non-transitory computer-readable storage medium according to claim 7, wherein the implementing the first neural network results in one parameter that is a regularization parameter.

9. The non-transitory computer-readable storage medium according to claim 7, wherein the implementing the first neural network results in two or more parameters that are weights corresponding with a set of predefined regularization parameters.

10. The non-transitory computer-readable storage medium according to claim 7, further comprising training the first neural network and the second neural network individually or together in an end-to-end arrangement.

11. The non-transitory computer-readable storage medium according to claim 7, further comprising obtaining, by the processing circuitry, a point spread function that defines the blur in the input image.

12. The non-transitory computer-readable storage medium according to claim 11, wherein the input image is obtained by a camera in a vehicle and the point spread function is obtained from one or more sensors of the vehicle or from the camera based on a calibration.

13. A vehicle comprising:
    a camera configured to obtain an input image that includes blur and noise; and
    processing circuitry configured to implement a first neural network on the input image to obtain one or more parameters, wherein the first neural network is configured to obtain a one-dimensional vector of singular values from the input image and implement a one-dimensional residual convolutional neural network (CNN), to perform regularized deconvolution to obtain a deblurred image from the input image, wherein the regularized deconvolution uses the one or more parameters to control noise in the deblurred image, and to implement a second neural network to remove artifacts from the deblurred image and provide an output image.

14. The vehicle according to claim 13, wherein the processing circuitry is configured to implement the first neural network and obtain one parameter that is a regularization parameter or obtain two or more parameters that are weights corresponding with a set of predefined regularization parameters.

15. The vehicle according to claim 13, wherein the processing circuitry is configured to train the first neural network and the second neural network individually or together in an end-to-end arrangement.

16. The vehicle according to claim 13, wherein the processing circuitry is configured to obtain a point spread function that defines the blur in the input image.

17. The vehicle according to claim 16, wherein the processing circuitry is configured to obtain the point spread function from one or more sensors of the vehicle that measure a movement of the vehicle or from a calibration of the camera.

* * * * *